(12) United States Patent
Hönlinger et al.

(10) Patent No.: US 6,343,782 B1
(45) Date of Patent: Feb. 5, 2002

(54) VIBRATION CANCELLER

(75) Inventors: Herwig Hönlinger, Gross-Rohrheim; Günter Zeis, Weinheim, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/327,119

(22) Filed: Jun. 7, 1999

(30) Foreign Application Priority Data

Jun. 5, 1998 (DE) .......................................... 198 25 131

(51) Int. Cl.⁷ ................................................ F16M 1/00
(52) U.S. Cl. ........................ 267/136; 267/153; 267/292; 248/638; 248/634
(58) Field of Search ................................ 267/136, 139, 267/140, 140.2, 153, 292; 188/378, 379, 380; 248/632, 638, 634, 636, 618

(56) References Cited

U.S. PATENT DOCUMENTS

| | | | |
|---|---|---|---|
| 4,764,152 A | * 8/1988 | Jorg et al. | ................... 464/89 |
| 4,991,412 A | * 2/1991 | Bauer et al. | .................. 68/23.1 |
| 5,203,856 A | * 4/1993 | Stephens | ..................... 408/159 |
| 5,549,271 A | * 8/1996 | Hamaekers | .............. 267/141.1 |
| 5,564,836 A | * 10/1996 | Ide et al. | ..................... 384/122 |

FOREIGN PATENT DOCUMENTS

DE    43 28 667    9/1994

\* cited by examiner

Primary Examiner—Robert J. Oberleitner
Assistant Examiner—Mariano Sy
(74) Attorney, Agent, or Firm—Kenyon & Kenyon

(57) ABSTRACT

A vibration canceller having an inertial mass that is non-positively joined to at least one spring element. The spring element is made exclusively of elastomeric material, is configured in substantially rod-shaped fashion, and is equipped on at least one of its end faces with a plug-shaped enlargement, the enlargement being arranged, under elastic preload, in a congruently configured opening of the inertial mass.

12 Claims, 3 Drawing Sheets

VIBRATION CANCELLER

FIELD OF THE INVENTION

The invention concerns a vibration canceller comprising an inertial mass that is nonpositively joined to at least one spring element.

BACKGROUND OF THE INVENTION

A vibration canceller of this kind is described in DE 43 28 667 C1. The inertial mass therein is made of a dimensionally stable material, the spring element being equipped with a vulcanized-in metallic clamping element that can be pressed into an opening of the inertial mass and thereby retained thereon. Assembly of the vibration canceller is very simple, and the join exhibits good durability.

SUMMARY OF THE INVENTION

It is the object of the invention to further develop a vibration canceller of the known type in such a way that the spring element is of simpler configuration, and the entire vibration canceller can therefore be manufactured more economically.

In order to achieve the object, in the context of the present invention provision is made for the spring element to be made exclusively of elastomeric material, to be configured in substantially rod-shaped fashion, and to be equipped on at least one of its end faces with a plug-shaped enlargement. The enlargement is arranged, under elastic preload, in a congruently configured opening of the inertial mass. The advantage here is that the manufacture of, in particular, samples, small production quantities, and vibration cancellers with complexly configured inertial masses, is considerably simplified. The vibration canceller according to the present invention renders superfluous any laborious vulcanization of the inertial mass and spring element, as the spring element need not be vulcanized onto (i.e., it is nonpositively joined to) the inertial mass. Tuning of the vibration canceller in test-stand experiments is particularly easy, since the inertial mass and the spring element are joined in nonadhesive fashion, and different inertial masses can therefore be easily and quickly assembled to different spring elements. Also advantageous is the fact that recycling of the vibration canceller is simplified by the fact that the parts are joined merely by a press fit, and that materials which are problematic in this context—for example lead, which is often used as an inertial mass because of its high density—can easily be separated from the elastomeric material of the spring element.

The spring element preferably has a substantially double-T-shaped cross section, and has on the second end face facing away from the inertial mass a further plug-shaped enlargement which can be pressed, under elastic preload, into a congruently configured opening of the vibrating machine element. As a result, it is particularly easy to install the vibration canceller on the vibrating machine element.

According to an advantageous embodiment, the spring element can be of rotationally symmetrical configuration. A rotationally symmetrical configuration of the spring element, but at least of the enlargements, is advantageous to the extent that the openings must have a congruent configuration, and holes in the inertial mass and/or the machine element can be made in a particularly easy and economical fashion.

The ratio between the diameter of the enlargement and the diameter of the rod which joins the enlargements to one another should be at least three to one. It is advantageous in this context that such a ratio ensures that the preload necessary for the enlargements to fit immovably in the openings does not have a disadvantageous effect on the utilization properties of the rod and thus the utilization properties of the spring element.

The inertial mass can be configured as a canceller plate, and can have at least three openings, distributed peripherally, into each of which a spring element can be pressed.

The enlargements and/or the openings can have an installation bevel on the sides which face toward one another in the installation direction. The advantage here is that damage and/or excessive abrasive wear are prevented during installation of the enlargements into the openings. The installation bevels of the enlargements can be constituted, for example, by radii in the region of the two axial end faces. The installation bevels of the openings are preferably constituted by 45-degree chamfers.

Depending on the particular demands of the application, it may be advantageous for the outer peripheries of the enlargements and/or the walls delimiting the openings to have surface profiling. The surface profiling can be constituted, for example, by an increased roughness on at least one of the mutually facing surfaces of the enlargement and/or the walls delimiting the openings. The canceller mass is preferably made of a metallic material, the wall delimiting the opening preferably having a mean surface roughness R. of at least 100, and preferably 300 $\mu$m. According to another embodiment, the walls delimiting the openings can be equipped with a coil that is screwed in in the form of threads, so as further to improve strength by way of an additional positive join. The spring element, in particular at least one of the plug-shaped enlargements, can be equipped with engagement surfaces for tools so that the plug-shaped enlargements can be pulled into the congruently configured openings of the inertial mass.

BRIEF DESCRIPTION OF THE FIGURE

The vibration canceller according to the present invention will be explained below with reference to the Figures, in which, in a schematic depiction in each case.

DETAILED DESCRIPTION OF THE INVENTION

Figure 1:
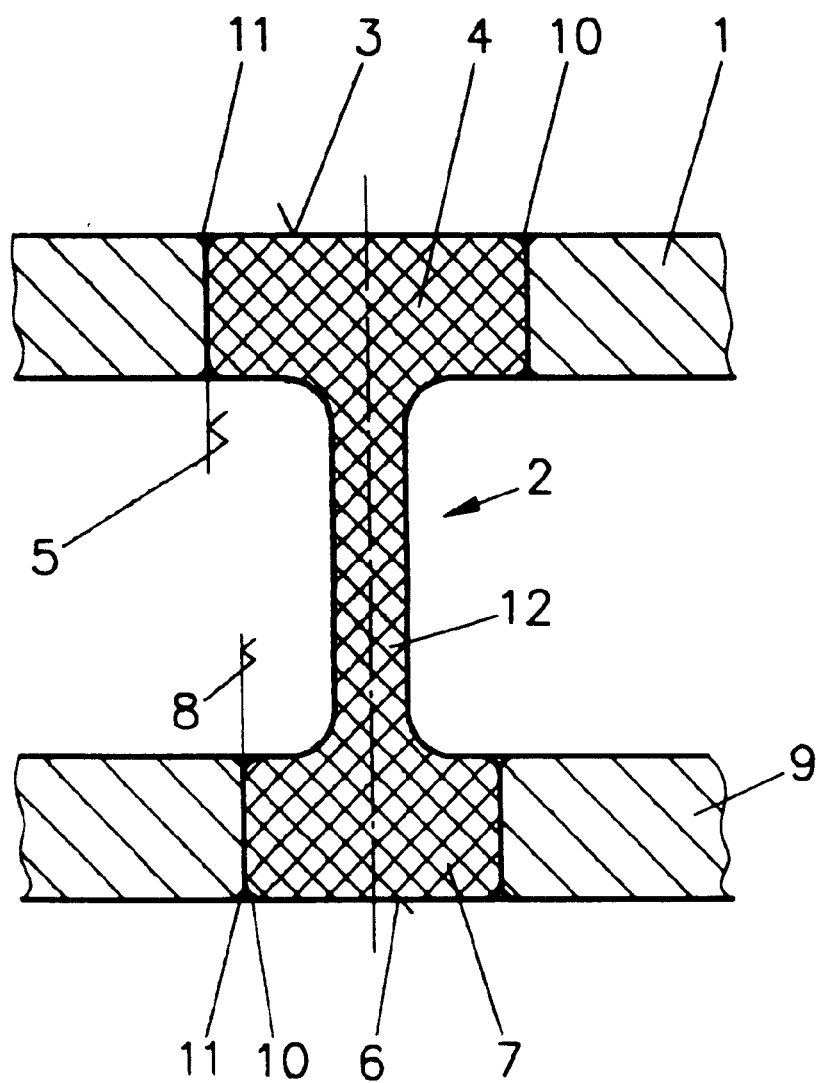
FIG. 1 is a cross-sectional view taken through a spring element that is assembled to an inertial mass and a machine element.

FIG. 1 shows an exemplary embodiment of a vibration canceller according to the present invention whose inertial mass 1 is joined in nonadhesive fashion to spring element 2 by nonpositive engagement.

Spring element 2 is of rod-shaped configuration and is made exclusively of an elastomeric material. Arranged in the region of each of its two end surfaces 3, 6 is a plug-shaped enlargement 4, 7, enlargements 4, 7 each being pressed into congruently configured openings 5, 8 of inertial mass I and of machine element 9. In this exemplary embodiment, the ratio between the diameters of second enlargement 7 and rod 12 is three to one. The ratio between the diameter of first enlargement 4 and rod 12 is greater than three to one. Because the ratio is always three to one or more, the utilization properties of spring element 2 are not disadvantageously influenced despite the high elastic preload with which enlargements 4, 7, are arranged in the respective openings.

In this exemplary embodiment, both the circumferential boundaries of enlargements 4, 7 and the walls of inertial mass 1 and machine element 9 delimiting openings 5, 8 are of cylindrical configuration. Embodiments deviating therefrom, for example conical enlargements that are arranged in corresponding openings, are also conceivable. A configuration of this kind is a good choice, for example, when a relatively enlarged contact surface between the enlargements and the respectively adjacent machine parts is required. The cross section of enlargement 4 is conically enlarged in the direction of the static load of inertial mass 1. Any loss of inertial mass 1 is reliably prevented even if spring element 2, which is made of rubber, relaxes slightly during a long period of utilization of the vibration canceller.

In the exemplary embodiment shown here, both enlargements 4, 7 and openings 5, 8 are equipped, on the sides facing one another in the installation direction, with installation bevels 10, 11 in order to prevent damage to or destruction of spring element 2, which is made of elastomeric material, while it is being pressed into inertial mass I and/or machine element 9.

Figure 2:
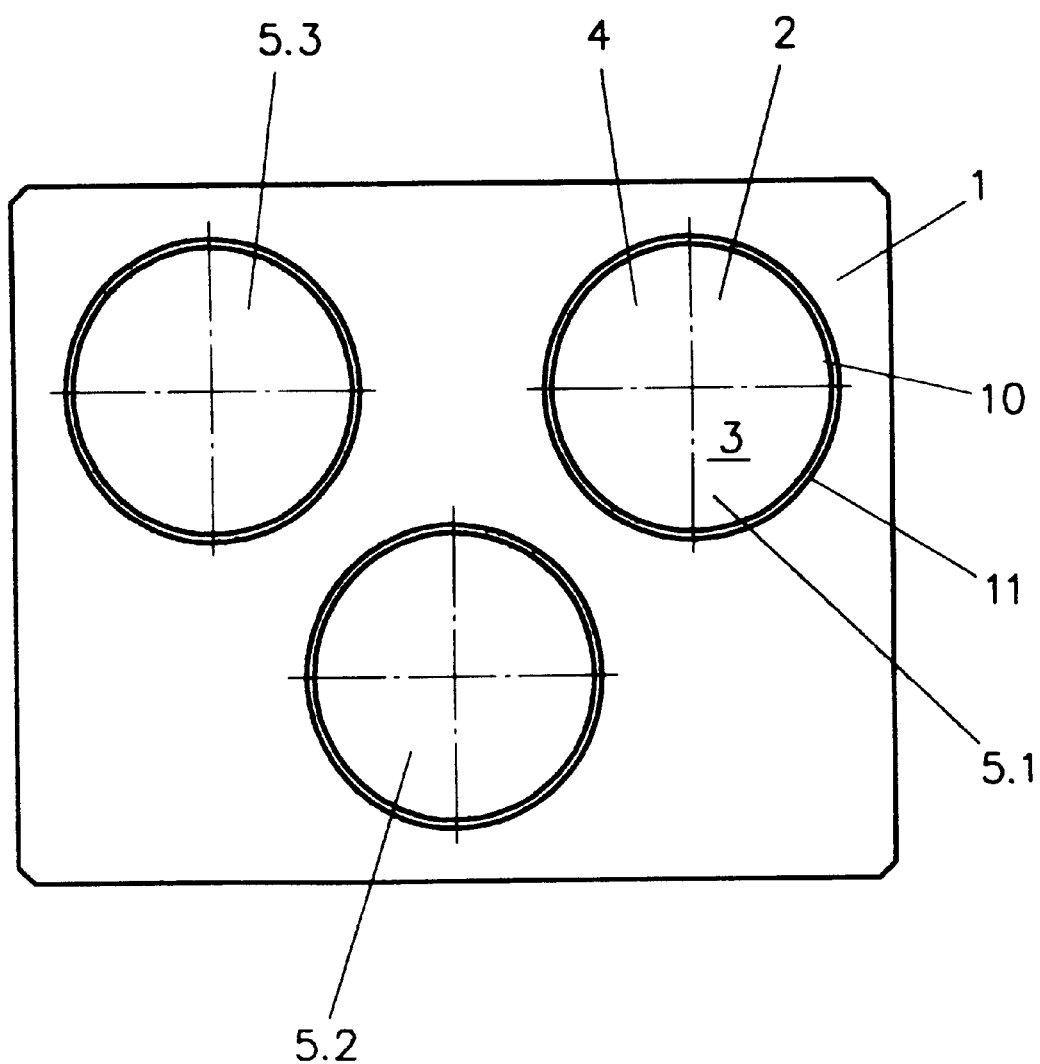
FIG. 2 is a plan view of a canceller plate that is joined to three spring elements.

FIG. 2 shows a plan view of the exemplary embodiment of FIG. 1. It is evident that inertial mass 1 is configured as a canceller plate and has three openings 5.1, 5.2, 5.3 distributed peripherally, into each of which are pressed first end faces 3 of spring elements 2. The installation bevels of openings 5.1, 5.2, 5.3 are configured as chamfers, and labeled with the reference character 11.

Figure 3:
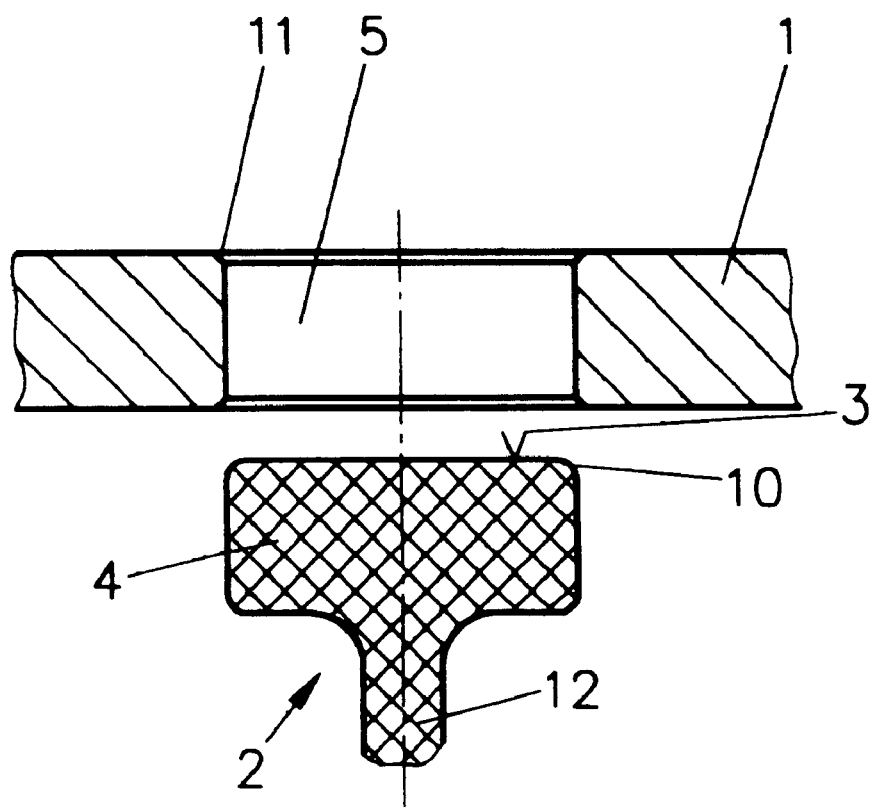
FIG. 3 shows a portion of an opening and a spring element in the region of its enlargement, the opening and the enlargement being shown in the uninstalled state.

FIG. 3 shows respective portions of spring element 2 and inertial mass 1 spring element 2 and inertial mass 1 being shown in the uninstalled state. The diameter of enlargement 4 is slightly greater than the diameter of opening 5, so that after the incompressible elastomeric material has been pressed into opening 5, a permanent press fit results. Installation bevels 10, 11 are arranged on the mutually facing sides of inertial mass 1 and spring element 2.

What is claimed is:

1. A vibration canceller comprising:

an inertial mass;

at least one spring element made entirely of elastomeric material, the spring element being joined to the inertial mass via a press fit connection between the elastomeric material and the inertial mass, wherein the spring element is substantially rod-shaped, has two end faces, and is provided with a plug-shaped enlargement on at least one of its end faces, and wherein the enlargement is arranged, under elastic preload, in a congruently configured opening in the inertial mass.

2. The vibration canceller as defined in claim 1, wherein the spring element has a substantially double-T-shaped cross section, and one of its end faces faces away from the inertial mass, such that it has on that end face facing away from the inertial mass a further plug-shaped enlargement which can be pressed, under elastic preload, into a congruently configured opening of a vibrating machine element.

3. The vibration canceller as defined in claim 1, wherein the spring element is rotationally symmetrical.

4. The vibration canceller as defined in claim 2, wherein the spring element is rotationally symmetrical.

5. The vibration canceller as defined in claim 1, wherein the inertial mass is configured as a canceller plate, and has at least three peripherally distributed openings into each of which a spring element can be pressed.

6. The vibration canceller as defined in claim 1, wherein the enlargements and/or the openings have an installation bevel on sides which face toward one another in the installation direction.

7. The vibration canceller as defined in claim 1, wherein the enlargements have outer peripheral surfaces that have surface profiling.

8. The vibration canceller as defined in claim 1, wherein the walls delimiting the openings have surface profiling.

9. The vibration canceller as defined in claim 1, wherein the enlargements have outer peripheral surfaces that have surface profiling and wherein the walls delimiting the openings have surface profiling.

10. The vibration canceller as device in claim 1, wherein a ratio of a diameter of the enlargement to a diameter of the rod portion is at least 3:1.

11. The vibration canceller as defined in claim 2, wherein a ratio of a diameter of the further plug shaped enlargement to a diameter of the rod portion is 3:1.

12. The vibration canceller as device in claim 11, wherein a ratio of a diameter of the enlargement to the diameter of the rod portion is at least 3:1.

\* \* \* \* \*

UNITED STATES PATENT AND TRADEMARK OFFICE
CERTIFICATE OF CORRECTION

PATENT NO. : 6,343,782 B1
DATED : February 5, 2002
INVENTOR(S) : Hönlinger et al.

It is certified that error appears in the above-identified patent and that said Letters Patent is hereby corrected as shown below:

Column 2,
Line 64, change "l" to -- 1 --; and

Column 3,
Line 47, after "being" insert -- frictionally and non-positively --

Signed and Sealed this

Twenty-ninth Day of July, 2003

JAMES E. ROGAN
*Director of the United States Patent and Trademark Office*